R. R. STEWART.
CORE AGITATOR.
APPLICATION FILED MAY 11, 1909.
937,554.
Patented Oct. 19, 1909.
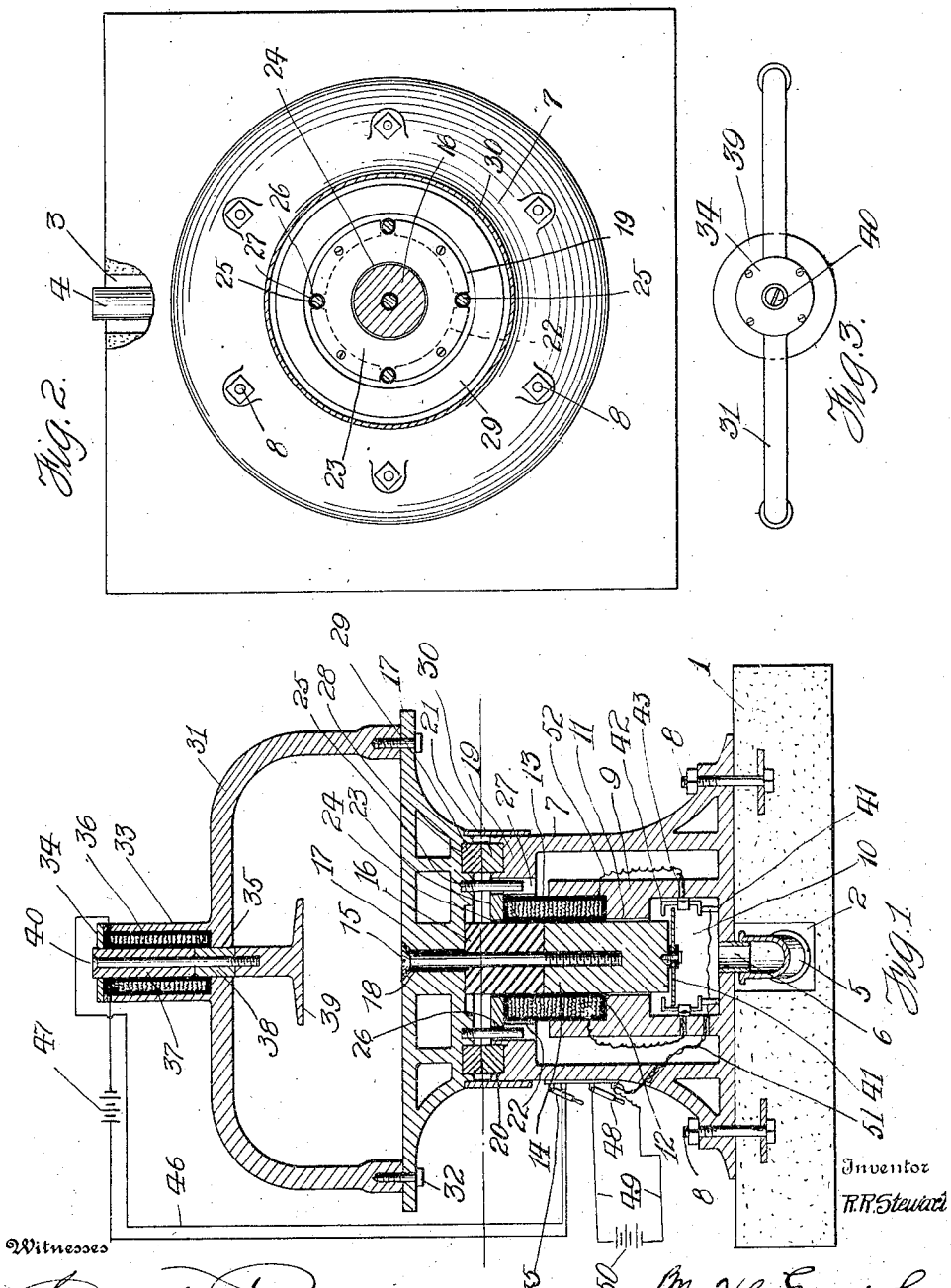
Witnesses
Samuel Payne
X.H. Butler
Inventor
R.R. Stewart
By H.C. Evert
Attorneys

UNITED STATES PATENT OFFICE.

ROBERT R. STEWART, OF PITTSBURG, PENNSYLVANIA.

CORE-AGITATOR.

937,554.   Specification of Letters Patent.   Patented Oct. 19, 1909.

Application filed May 11, 1909. Serial No. 495,277.

*To all whom it may concern:*

Be it known that I, ROBERT R. STEWART, a citizen of the United States of America, residing at Pittsburg, in the county of Allegheny and State of Pennsylvania, have invented certain new and useful Improvements in Core-Agitators, of which the following is a specification, reference being had therein to the accompanying drawing.

This invention relates to a core agitator, and more particularly to a machine for removing cores from molded articles or molds.

The invention has for its primary object to provide a machine wherein positive and reliable means is employed for vibrating a mold to cause the sand or core thereof to settle and become thoroughly packed or tamped in those parts of a mold not readily reached by an instrument. It is through the medium of such a machine that the work of a molder is facilitated, particularly in placing cores in a mold.

Another object of the invention is to provide a novel machine wherein electricity is employed as a power for subjecting a molded article or mold to vibrations that will tend to loosen and eventually dislodge the core or particles of the core of a molded article or mold.

A further object of this invention is to provide a simple and durable machine for effectually cleaning molded articles or molds without the use of a blast of air and specially designed tools.

The above objects are attained by a novel machine having a reciprocatory table upon which the molded articles or molds are placed to be vibrated by a movement of the table for loosening and freeing sand or similar matter used as a core in the production of the molded article. The molded article or mold is retained upon the table by an electrical clamping device, and another electrical device is embodied within the machine for reciprocating or vibrating the table, whereby all parts of the core can be quickly removed from an article or mold placed upon the table.

The invention will be hereinafter considered in detail and then specifically pointed out in the appended claims, and reference will now be had to the drawing forming a part of this application, wherein there is illustrated a preferred embodiment of the invention, but it is to be understood that the structural elements thereof can be varied or changed as to the size, shape and manner of assemblage without departing from the spirit and scope of the invention.

In the drawings:—Figure 1 is a vertical sectional view of the machine constructed in accordance with my invention, Fig. 2 is a sectional plan of the same, and Fig. 3 is a plan of a bridge forming part of the table.

In the drawings, 1 denotes a suitable foundation, preferably of concrete, having a central vertical opening 2 communicating with a radially disposed opening 3. In the opening 3 is located an air supply pipe 4 connected by an elbow 5 to a vertical pipe 6 within the opening 2, said vertical pipe connecting with a cylindrical stand 7 anchored, as at 8, upon the foundation 1. The stand 7 is provided with a central enlargement 9 having a compartment 10 formed therein communicating with the pipe 6. The enlargement 9 is provided with a vertical bore 11 and is cut away to provide an annular shoulder 12 approximately half the depth of the bore 11.

13 denotes a solenoid resting upon the annular shoulder 12 within the enlargement 9, said solenoid having a movable core 14 provided with a central screw 15. Retained upon the core 14 and the screw 15 is a block of insulation 16 and a table 17, said table being insulated from the screw 15 by a lining 18.

19 designates an annular enlargement carried by the upper inner edges of the stand 7, said enlargement having an annular groove 20 formed therein for an annular buffer 21. The enlargement 19 is provided with an inwardly projecting flange 22 embracing the upper end of the solenoid 13, said flange supporting a circular plate 23, which also rests upon the upper end of the solenoid 13, said plate 23 having a central circular opening 24 for the block of insulation 16.

The table 17 is circular in plan and the bottom of said table is provided with a plurality of depending guide pins 25, said pins extending through vertical notches 26 formed in the periphery of the plate 24, and through vertical notches 27 formed in the vertical edges of the enlargement 19 of the stand 7. The bottom of the table is also provided with an annular groove 28 in which is mounted an annular buffer 29 adapted to coöperate with the buffer 21 in cushioning the movement of the table 17. The lower poripheral edges of the table 17 are provided with depending flanges 30 adapted to surround the upper end of the stand 7 and exclude sand and foreign matter from the space between the stand and the table.

31 designates a bridge detachably mounted upon the stand by screw bolts 32. This bridge intermediate the ends thereof and centrally of the table 17 is provided with a casing 33 having a detachable plate 34. The bridge 31 is provided with a central vertical opening 35 communicating with the casing 33, and in said casing is located a solenoid 36 having a central movable core 37, to which is connected a block 38 and a head 39 by a screw 40.

41 designates a cross bar connected to and insulated from the lower end of the core 14. The ends of this bar are adapted to contact with arms 42 slidably mounted in brackets 43 carried by the inner opposite sides of the compartment 10, the lower ends of said arms normally resting upon the upper ends of posts 44 mounted in said compartment.

45 designates a knife switch carried by the stand 7 and connected by wires 46 to the solenoid 36; a battery 47 or suitable source of electrical energy being interposed in one of the wires 46.

48 designates another knife switch secured to the stand 7, said switch being connected by wires 49 to a battery 50 or suitable source of electrical energy. The knife switch 48 is connected by wires 51 to the posts 44, and the brackets 43 are connected by wires 52 to the solenoid 13.

Operation: After a piece of work has been placed upon the table 17, the knife switch 45 is closed to complete a circuit through the solenoid 36, and when this solenoid is energized, the head 39, which constitutes the clamping member, is moved into engagement with the piece of work to hold and clamp the piece of work upon the table 17. The knife switch 48 is then closed to energize the solenoid 13, and when this solenoid is energized it is immediately raised. The cross bar 41 raises the arms 42 and breaks the circuit through the solenoid at the post 44, consequently the table 17 drops by gravity, as do the arms 42, again completing a circuit through the solenoid 13, causing the table to be again elevated. This vertical reciprocating movement of the table continues as long as the knife switch 48 is closed. A lowering movement of the table 17 is limited by the buffers 21 and 29, and an upward movement of the table is limited by the arms 42 contacting with the top of the compartment 10. The pipes 4 and 6 are provided to admit air to the compartment 10, whereby the core of the solenoid can operate under ordinary atmospheric conditions.

From the foregoing description taken in connection with the drawings, it will be observed that I have devised a novel machine wherein electrical means is employed for reciprocating or vibrating a table while another electrical means is employed for clamping a piece of work upon the table.

Having now described my invention, what I claim as new, is:—

1. In a core agitating machine, the combination with sources of electrical energy, and solenoids in circuit with said sources, of a stand adapted to support one of said solenoids, a table connected to the core of said solenoid and adapted to be reciprocated when said solenoid is energized, a bridge carried by said table and adapted to support the other of said solenoids, a clamping member connected to the core of the last mentioned solenoid for clamping a piece of work upon said table when the last-mentioned solenoid is energized, and means for cushioning the movement of said table relative to said stand during the reciprocating movement of the table.

2. In a core agitating machine, the combination with sources of electrical energy, and solenoids, of a stand adapted to support one of said solenoids, a table connected to the core of said solenoid and adapted to be intermittently reciprocated when said solenoid is energized, a bridge carried by said table and adapted to support the other of said solenoids, and a clamping member connected to the core of the last-mentioned solenoid for holding a piece of work upon said table when the last-mentioned solenoid is energized.

3. A core agitating machine, comprising a stand, a solenoid supported by said stand, a table arranged above said stand and adapted to be reciprocated through the medium of said solenoid when the latter is energized, a solenoid arranged above said table, and a clamping member actuated by said solenoid when the latter is energized for holding a piece of work upon said table during the movement thereof.

4. In a core agitating machine, the combination with solenoids, and means for controlling the energy of said solenoids, of a stand supporting one of said solenoids, a table supported by the core of said solenoid, a bridge carried by said table and adapted to support the other of said solenoids, a clamp actuated by the last mentioned solenoid for clamping a piece of work upon said table, and means arranged within said stand and actuated by a movement of the core of the first mentioned solenoid for making and breaking the circuit through said solenoid on the movement of the core of the latter.

5. In a core agitating machine, the combination with solenoids, and means for controlling the energy of said solenoids, of a stand supporting one of said solenoids, a table supported by the core of said solenoid, a bridge carried by said table and adapted to support the other of said solenoids, a clamp actuated by the last mentioned solenoid for clamping a piece of work upon said table, and means arranged upon said stand and actuated by a movement of the core of the first mentioned solenoid for making and breaking the circuit through said solenoid, and means in connection with said table for guiding the movement of said table.

6. In a core agitating machine, the combination with solenoids, and means for controlling the energy of said solenoids, of a stand supporting one of said solenoids, a table supported by the core of said solenoid, a bridge carried by said table and adapted to support the other of said solenoids, a clamp actuated by the last mentioned solenoid for clamping a piece of work upon said table, and means arranged upon said stand and actuated by a movement of the core of the first mentioned solenoid for making and breaking the circuit through said solenoid, means in connection with said table for guiding the movement of said table, and means interposed between said table and said stand for cushioning the movement of said table.

7. In a core agitating machine, a stand, a movable table arranged above said stand and adapted to receive the work, electrical means within said stand for moving the table, means within said stand for making and breaking an electrical circuit whereby a reciprocating movement is imparted to the table, and electrical means carried by the table for clamping the work thereon, and a buffing means interposed between the stand and the table whereby the movement of the table is cushioned.

8. In a core agitating machine, a stand, a movable table arranged above said stand and adapted to receive the work, electrical means within said stand for moving the table, means within said stand for making and breaking an electrical circuit whereby a reciprocating movement is imparted to the table, electrical means carried by the table for clamping the work thereon, and means for guiding the table during the reciprocation thereof.

9. In a core agitating machine, a stand, a movable table arranged above said stand and adapted to receive the work, electrical means within said stand for moving the table, means within said stand for making and breaking an electrical circuit whereby a reciprocating movement is imparted to the table, electrical means carried by the table for clamping the work thereon, means for guiding the table during the reciprocating thereof, and means interposed between the table and stand for cushioning the movement of the table during the reciprocation thereof.

In testimony whereof I affix my signature in the presence of two witnesses.

ROBERT R. STEWART.

Witnesses:
MAX H. SROLOVITZ,
DAVID FURNIER.